US012801643B2

(12) United States Patent
Tamayo et al.

(10) Patent No.: US 12,801,643 B2
(45) Date of Patent: Nov. 17, 2026

(54) STAGED DATA ACQUISITION

(71) Applicant: Capital One Services, LLC, McLean, VA (US)

(72) Inventors: Bryan Tamayo, Allen, TX (US); Courtney Sears Graves, Celina, TX (US); Allison Eltzholtz, Celina, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/978,466

(22) Filed: Dec. 12, 2024

(65) Prior Publication Data

US 2026/0170023 A1 Jun. 18, 2026

(51) Int. Cl.
*G06F 16/00* (2019.01)
*G06F 16/3329* (2025.01)
*G06F 16/3332* (2025.01)

(52) U.S. Cl.
CPC .... *G06F 16/33295* (2025.01); *G06F 16/3334* (2019.01)

(58) Field of Classification Search
CPC ....................... G06F 16/33295; G06F 16/3334
See application file for complete search history.

(56) References Cited

U.S. PATENT DOCUMENTS 9,332,123 B1 * 5/2016 Snyder .................. H04M 3/493
11,809,983 B2 11/2023 Long et al.
2011/0137808 A1 * 6/2011 Meyer .................. G06Q 10/083 379/88.08
2013/0218951 A1 * 8/2013 Scaletta ................ H04L 67/125 709/203
2014/0288971 A1 * 9/2014 Whibbs, III ........... G16H 10/20 705/3
2015/0193794 A1 * 7/2015 Douglas ............. G06Q 30/0203 705/7.32
2016/0063408 A1 * 3/2016 Rajaganesan ...... G06Q 10/0639 705/7.38
2019/0180299 A1 * 6/2019 Meyer ................ G06Q 30/0203
2020/0074294 A1 * 3/2020 Long ...................... G06N 3/044
2021/0158711 A1 * 5/2021 Smith ...................... G09B 7/06
2022/0383346 A1 * 12/2022 Barreto .............. G06Q 30/0245

* cited by examiner

*Primary Examiner* — Syed H Hasan
(74) *Attorney, Agent, or Firm* — Harrity & Harrity, LLP

(57) ABSTRACT

In some implementations, a data acquisition system may identify, responsive to an occurrence of a first trigger, a first prompt. The data acquisition system may transmit an indication of the first prompt and receive an indication of a first response to the first prompt. The data acquisition system may store the indication of the first response and an indication that the first response is associated with the first trigger. The data acquisition system may identify, responsive to an occurrence of a second trigger, a second prompt. The data acquisition system may transmit an indication of the second prompt and receive an indication of a second response to the second prompt. The data acquisition system may store the indication of the second response and an indication that the second response is associated with the second trigger.

20 Claims, 10 Drawing Sheets

STAGED DATA ACQUISITION

BACKGROUND

Data analytics involves using data to discover useful information, inform conclusions, and/or support decision-making. For example, an entity may collect data and use data analytics to monitor one or more functions of the entity, make decisions, and/or make recommendations, among other examples.

SUMMARY

Some implementations described herein relate to a system for staged data acquisition. The system may include one or more memories and one or more processors communicatively coupled to the one or more memories. The one or more processors may be configured to receive, via an application programming interface (API), an indication of a mapping of a plurality of prompts to a plurality of triggers associated with a multi-stage user procedure. The one or more processors may be configured to detect an occurrence of a first trigger of the plurality of triggers. The one or more processors may be configured to identify, responsive to the occurrence of the first trigger, using the mapping, a first prompt of the plurality of prompts that corresponds to the first trigger. The one or more processors may be configured to transmit an indication of the first prompt via the API. The one or more processors may be configured to receive an indication of a first response to the first prompt via the API. The one or more processors may be configured to store, in a database, the indication of the first response and an indication that the first response is associated with the first trigger. The one or more processors may be configured to identify one or more user resources indicating content that is relevant to the first response. The one or more processors may be configured to provide user access to the one or more user resources. The one or more processors may be configured to detect an occurrence of a second trigger of the plurality of triggers, wherein the second trigger is different from the first trigger. The one or more processors may be configured to identify, responsive to the occurrence of the second trigger, using the mapping, a second prompt of the plurality of prompts that corresponds to the second trigger, wherein the second prompt is different from the first prompt. The one or more processors may be configured to transmit an indication of the second prompt via the API. The one or more processors may be configured to receive an indication of a second response to the second prompt via the API. The one or more processors may be configured to store, in the database, the indication of the second response and an indication that the second response is associated with the second trigger.

Some implementations described herein relate to a method of staged data acquisition. The method may include receiving, via an API, an indication of a mapping of a plurality of prompts to a plurality of triggers associated with a multi-stage user procedure.

The method may include detecting an occurrence of a first trigger of the plurality of triggers. The method may include identifying, responsive to the occurrence of the first trigger, using the mapping, a first prompt of the plurality of prompts that corresponds to the first trigger. The method may include transmitting an indication of the first prompt via the API. The method may include receiving an indication of a first response to the first prompt via the API. The method may include storing, in a database, the indication of the first response and an indication that the first response is associated with the first trigger. The method may include detecting an occurrence of a second trigger of the plurality of triggers, wherein the second trigger is different from the first trigger. The method may include identifying, responsive to the occurrence of the second trigger, using the mapping, a second prompt of the plurality of prompts that corresponds to the second trigger, wherein the second prompt is different from the first prompt. The method may include transmitting an indication of the second prompt and the first response via the API. The method may include receiving an indication of a second response to the second prompt via the API. The method may include storing, in the database, the indication of the second response and an indication that the second response is associated with the second trigger.

Some implementations described herein relate to a non-transitory computer-readable medium that stores a set of instructions. The set of instructions, when executed by one or more processors of a device, may cause the device to receive, via an API, an indication of a mapping of a plurality of prompts to a plurality of triggers associated with a multi-stage user procedure. The set of instructions, when executed by one or more processors of the device, may cause the device to detect an occurrence of a first trigger of the plurality of triggers. The set of instructions, when executed by one or more processors of the device, may cause the device to identify, responsive to the occurrence of the first trigger, using the mapping, a first prompt of the plurality of prompts that corresponds to the first trigger. The set of instructions, when executed by one or more processors of the device, may cause the device to transmit an indication of the first prompt via the API. The set of instructions, when executed by one or more processors of the device, may cause the device to receive an indication of a first response to the first prompt via the API. The set of instructions, when executed by one or more processors of the device, may cause the device to store, in a database, the indication of the first response and an indication that the first response is associated with the first trigger. The set of instructions, when executed by one or more processors of the device, may cause the device to transmit, responsive to receiving the indication of the first response, administrator display information that indicates the first response. The set of instructions, when executed by one or more processors of the device, may cause the device to detect an occurrence of a second trigger of the plurality of triggers, wherein the second trigger is different from the first trigger. The set of instructions, when executed by one or more processors of the device, may cause the device to identify, responsive to the occurrence of the second trigger, using the mapping, a second prompt of the plurality of prompts that corresponds to the second trigger, wherein the second prompt is different from the first prompt. The set of instructions, when executed by one or more processors of the device, may cause the device to transmit an indication of the second prompt via the API. The set of instructions, when executed by one or more processors of the device, may cause the device to receive an indication of a second response to the second prompt via the API. The set of instructions, when executed by one or more processors of the device, may cause the device to store, in the database, the indication of the second response and an indication that the second response is associated with the second trigger.

DETAILED DESCRIPTION

Figure 1A:
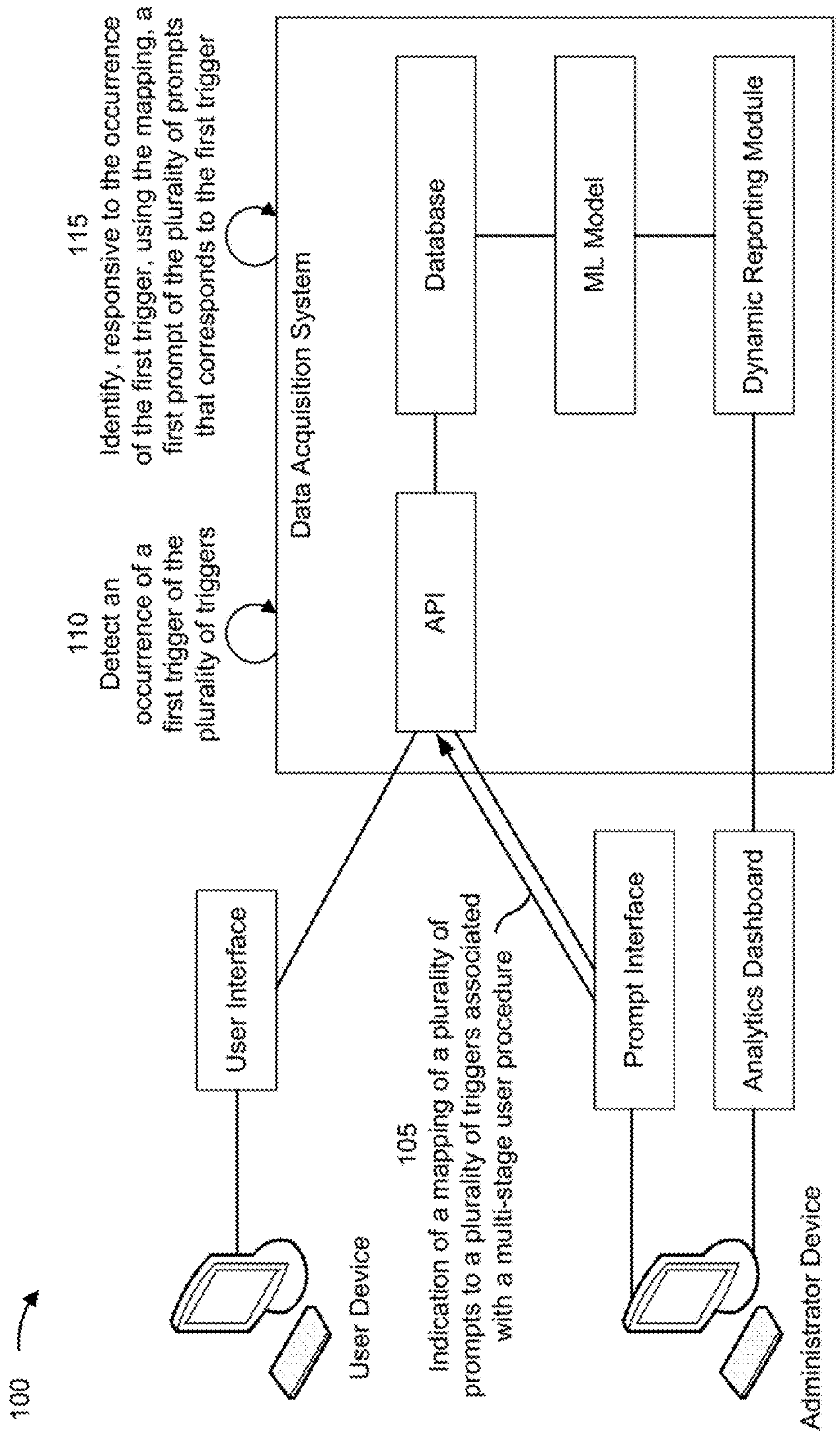
FIGS. 1A-1F are diagrams of an example associated with staged data acquisition, in accordance with some embodiments of the present disclosure.

The following detailed description of example implementations refers to the accompanying drawings. The same reference numbers in different drawings may identify the same or similar elements.

Traditional electronic long-form surveys often include numerous questions and, thus, can require excessive time for a respondent to complete. Furthermore, the questions are often presented together as a point-in-time survey that is conducted after the event(s) that are the subject of the survey. As a result, due to respondent fatigue caused by the long-form and point-in-time properties of traditional surveys, such surveys may yield inaccurate responses and/or poor response rates. Inaccurate responses and/or poor response rates can, in turn, lead to excessive consumption of memory, processing, and/or bandwidth resources. For example, the inaccurate responses and/or poor response rates may prompt distribution of additional surveys and/or survey questions, which may require excessive processing, memory, and/or bandwidth resources, to be sent out to help curate an accurate and/or representative data set.

Some implementations described herein enable electronic distribution of individual questions in a digital survey at respective stages of a process. The individual questions may be referred to as "micro-surveys." In some aspects, individual responses to the micro-surveys may be captured at the respective stages of the process. For example, once a first stage of the process has ended, a data acquisition system may transmit a first micro-survey and receive a first response to the first micro-survey; once a second stage of the process has ended, the data acquisition system may transmit a second micro-survey and receive a second response to the second micro-survey; and so forth. Thus, the data acquisition system may acquire data (e.g., the responses) in a staged manner. The process may include a customer journey through a website or software application (e.g., where the micro-surveys inquire about different stages of the customer journey in real-time), an employment (e.g., where the micro-surveys request employee feedback periodically), or the like. In some aspects, the data acquisition system may use machine learning (ML) models to analyze data collected via the micro-surveys to provide real-time servicing at the respective stages of the process. For example, the data acquisition system may provide dynamic reports to a survey owner, link to resources in response to one or more responses to the micro-surveys, generate predictive results based on historical data, or the like. In some aspects, the data acquisition system may continue to transmit micro-surveys while providing the real-time servicing (e.g., real-time analysis). For example, the micro-survey functionality may operate similarly to a live, interactive web page.

As a result, the data acquisition system may reduce consumption of memory, processing, and/or bandwidth resources. For example, distributing micro-surveys in a staged manner may help to improve respondent engagement (e.g., survey participation) and response accuracy. For example, introducing short micro-surveys that reduce respondent fatigue and alleviate the burden of long-form surveys for respondents may help to increase response accuracy and/or improve response rates. As a result, a lower overall quantity of surveys and/or survey questions can be distributed, which can conserve processing, memory, and/or bandwidth resources that would otherwise be allocated for distribution of many long-form surveys.

FIGS. 1A-1F are diagrams of an example 100 associated with staged data acquisition. As shown in FIGS. 1A-1F, example 100 includes a user device, an administrator device, and a data acquisition system. These devices are described in more detail in connection with FIGS. 3 and 4.

With reference to FIG. 1A, as shown by reference number 105, the data acquisition system may receive, via an API, an indication of a mapping of a plurality of prompts to a plurality of triggers associated with a multi-stage user procedure. The API (e.g., a survey API) may have a distributed architecture that helps to enable fast, reliable performance under heavy loads. A prompt may be a question, suggestion, or other communication designed to elicit a response from a user (e.g., a respondent). For example, the prompts may request feedback on customer service, product reviews, employee satisfaction, or the like. In some examples, the multi-stage user procedure may be a customer journey, an employment of the user, or the like. The plurality of triggers may be associated with the multi-stage user procedure in that the triggers may occur relative to (e.g., before, during, and/or after) the multi-stage user procedure. For example, a first trigger may be an end of a first stage of the multi-stage user procedure, a second trigger may be an end of a second stage of the multi-stage user procedure, and so forth. In some examples, the mapping may indicate which prompt(s) the data acquisition system is to transmit in response to a given trigger. For example, the mapping may indicate that the data acquisition system is to transmit sets of one or more prompts in response to respective triggers. Each set of one or more prompts may be considered a micro-survey. For example, each set of one or more prompts may be a short, focused survey of a small quantity of prompts (e.g., one or two prompts) designed to be quick and easy for respondents to answer. Individual micro-surveys may function independently in that the micro-surveys are associated with respective triggers, and the micro-surveys may also be associated with each other (e.g., as part of a larger survey corresponding to the overall multi-stage user procedure) for analysis and reporting purposes. As shown in FIG. 1, the data acquisition system may receive the indication of the mapping from a prompt interface (e.g., a survey interface module). The prompt interface may enable a survey administrator (e.g., a survey owner) to configure the plurality of prompts, the plurality of triggers, and/or the mapping. In some examples, the prompt interface may use edge computing to reduce latency, thereby delivering quick and responsive interactions across platforms.

As shown by reference number 110, the data acquisition system may detect an occurrence of a first trigger of the plurality of triggers. For example, the data acquisition system may determine that a first stage of the multi-stage user procedure has ended, a first amount of time has elapsed, the user has performed a first action (e.g., an interaction with software), or the like. In some examples, the data acquisition system may receive information indicating that the first trigger has occurred.

As shown by reference number 115, the data acquisition system may identify, responsive to the occurrence of the first trigger, using the mapping, a first prompt of the plurality of prompts that corresponds to the first trigger. For example, upon detecting the occurrence of the first trigger, the data acquisition system may perform a lookup in the mapping to identify the first prompt that corresponds to the first trigger. The first prompt may belong to a micro-survey that includes one or more first prompts mapped to the first trigger.

Figure 1B:
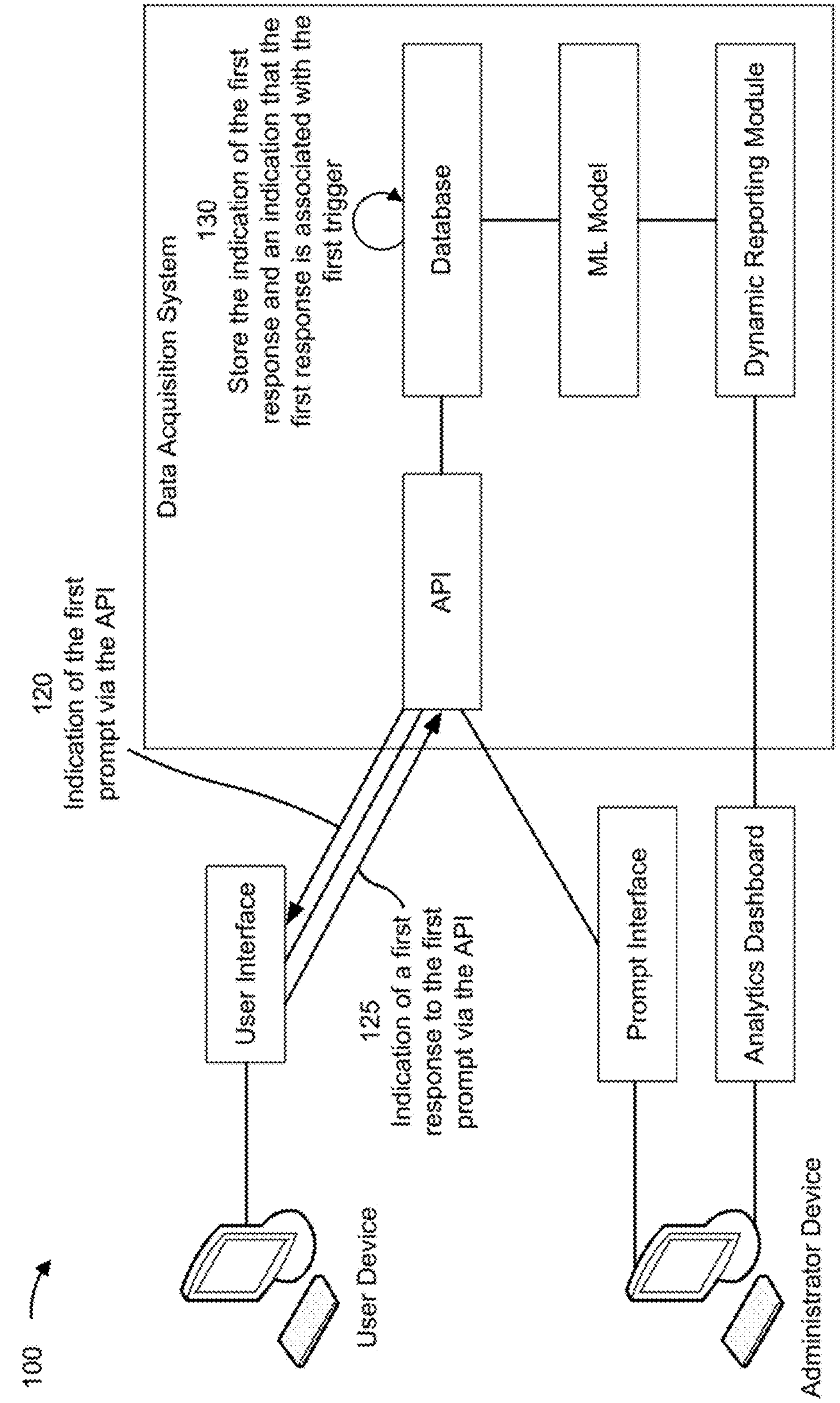

With reference to FIG. 1B, as shown by reference number 120, the data acquisition system may transmit an indication of the first prompt via the API. In some examples, a user interface may display (or cause to be displayed) the first prompt at the user device. The user interface may be compatible with various types of user devices (e.g., including old or low-bandwidth devices). In some examples, the data acquisition system may transmit the indication of the first prompt over a first digital channel. For example, the first digital channel may be social media, email, a mobile application, a website, a landing page, or the like. For example, the first prompt may be conveyed to a social media account of the user, an email address of the user, a mobile application stored on a mobile device of the user, a website or landing page visited by the user, or the like.

As shown by reference number 125, the data acquisition system may receive an indication of a first response to the first prompt via the API. For example, the user may view the first prompt displayed via the user interface and input the first response via the user interface. The first response may have any suitable format, such as quantitative (e.g., a number), qualitative (e.g., a written response containing one or more words), a selection from among multiple choices, a free response (e.g., where the user may provide any suitable input into a response field), or the like. In some examples, the data acquisition system may receive the first response from the user device (e.g., via the user interface).

As shown by reference number 130, the data acquisition system may store, in a database, the indication of the first response and an indication that the first response is associated with the first trigger. For example, the indication that the first response is associated with the first trigger may indicate that the first response is a response to a prompt (e.g., the first prompt) that was transmitted based on an occurrence of the first trigger. The database (e.g., a survey database) may be a centralized database that collects, aggregates, and/or updates responses in real-time. In some examples, the database may be part of a hybrid database system that links and stores both current and historical survey data using a distributed storage setup.

Figure 1C:
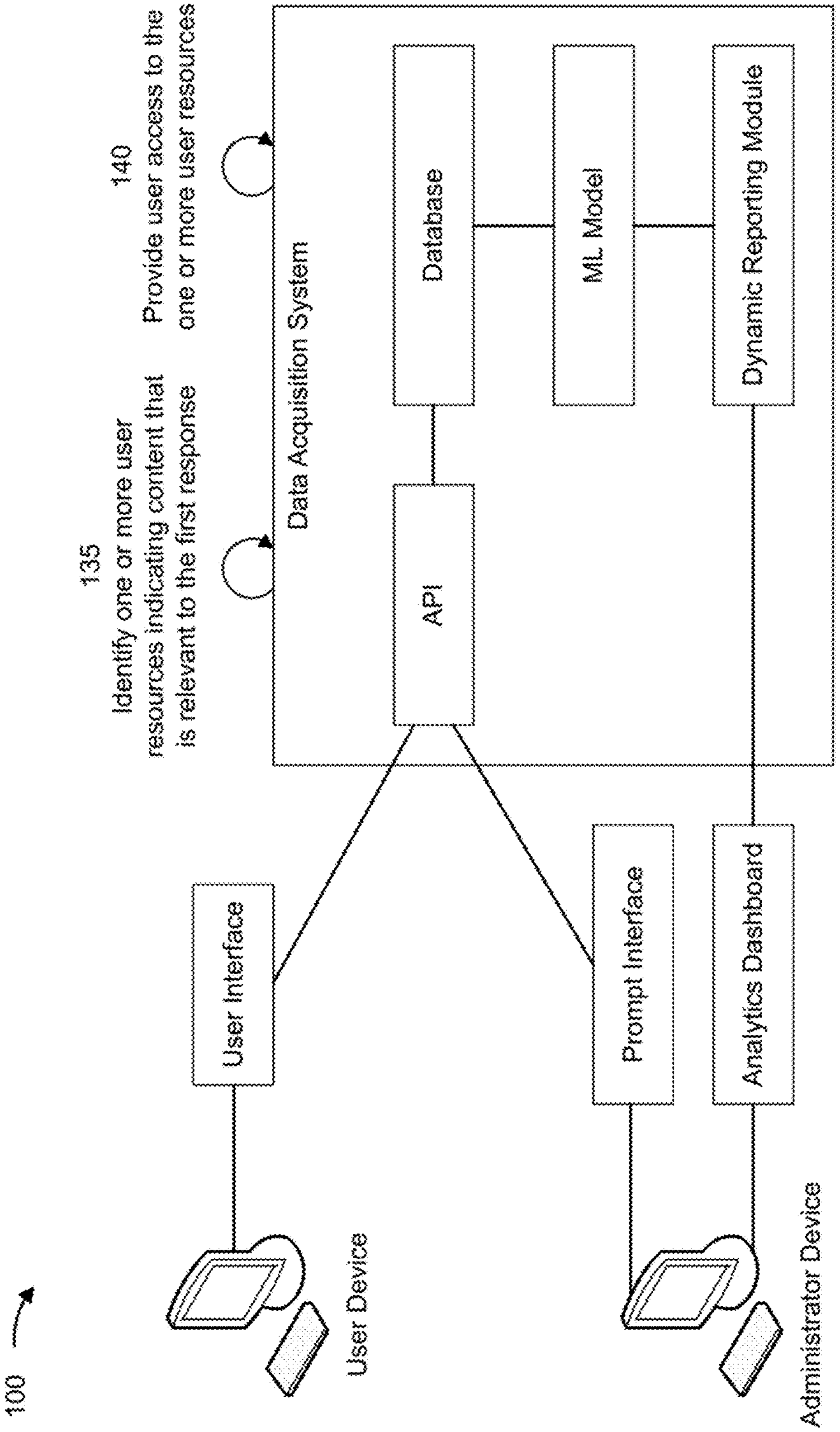

With reference to FIG. 1C, as shown by reference number 135, the data acquisition system may identify one or more user resources indicating content that is relevant to the first response. For example, the user resource(s) may include a web page, an article, a message, contact information (e.g., a website, a phone number, an email address, or other contact information), training content, a user interface, a video, an indication of one or more recommended actions (e.g., a series of "next steps"), and/or another type of resource that indicates content. In some examples, the user resources may be stored in a pre-built library (e.g., designed at least in part by the survey administrator).

As shown by reference number 140, the data acquisition system may provide user access to the one or more user resources. For example, the user device may display the user interface, which may enable the user to access, search, and/or navigate between the one or more recommended resources. Thus, the data acquisition system may automatically offer relevant resources based on user feedback (e.g., based on at least the first response). For example, the data acquisition system may use micro-surveys to provision resources promptly. For example, depending on whether a user provides a positive or negative response to a prompt soliciting feedback regarding the multi-stage user procedure, the data acquisition system may quickly provide relevant links or learning resources for the user. This targeted resource delivery may thereby enable the user to proceed through the multi-stage user procedure.

Figure 1D:
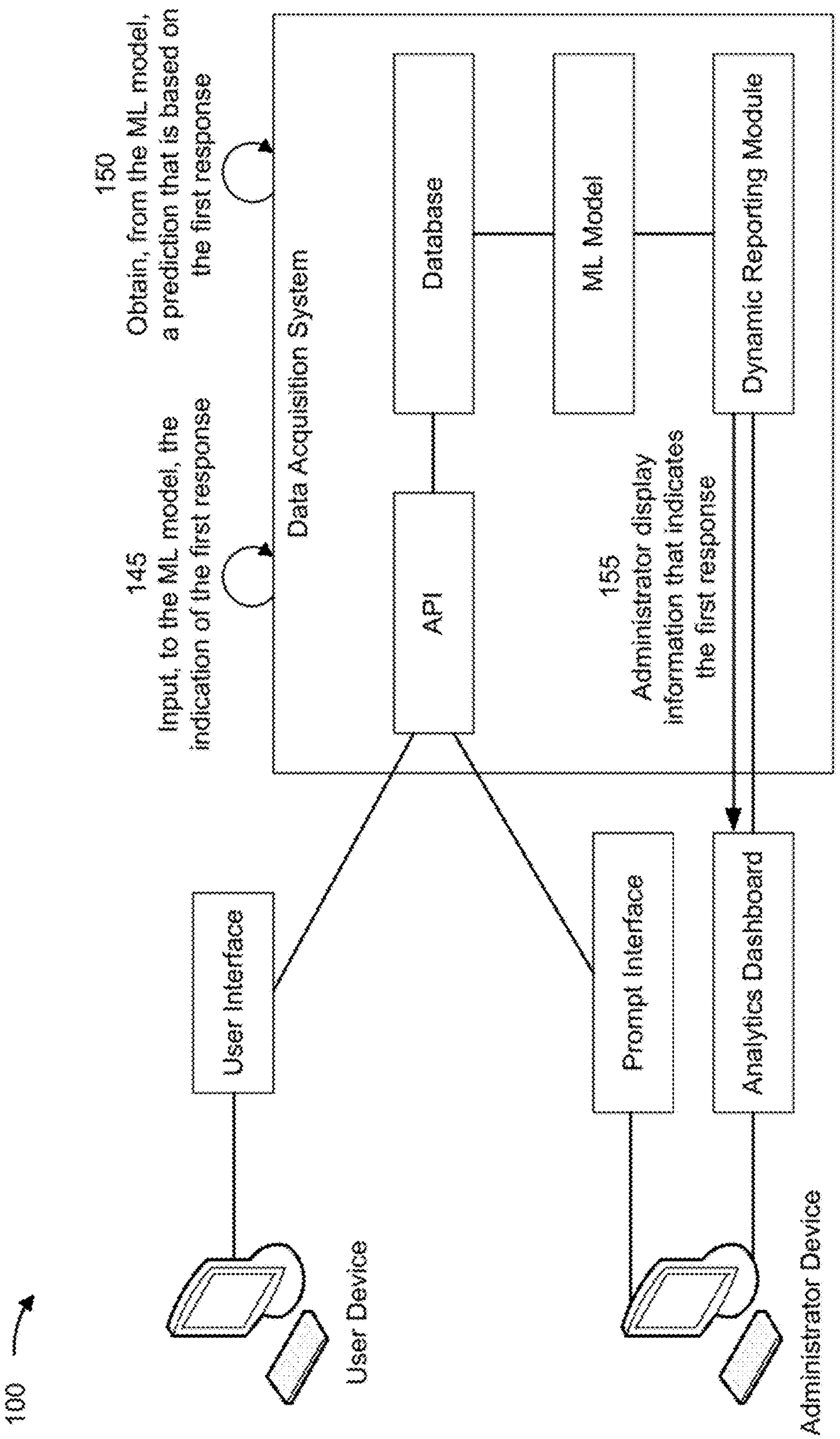

With reference to FIG. 1D, as shown by reference number 145, the data acquisition system may input, to an ML model, the indication of the first response. The ML model (e.g., an artificial intelligence model) may be part of a prediction engine that analyzes response patterns and forecasts future trends based thereon. In some examples, the ML model may be trained using a set of observations. The set of observations may be obtained from training data (e.g., historical data), such as response data gathered during one or more processes described herein.

As shown by reference number 150, the data acquisition system may obtain, from the ML model, a prediction that is based on the first response. For example, the data acquisition system may apply the ML model to a new observation (e.g., the first response) to generate the prediction. The type of prediction may depend on a type of the ML model and/or a type of an ML task being performed. For example, the prediction may include a predicted value of a target variable, such as when supervised learning is employed. Additionally, or alternatively, the output may include information that identifies a cluster to which the first response belongs and/or information that indicates a degree of similarity between the first response and one or more other responses, such as when unsupervised learning is employed.

In some aspects, the prediction obtained from the ML model may be associated with one or more predicted responses. The prediction may be associated with one or more predicted responses in that the prediction may indicate the predicted response(s). For example, the ML model may predict, using the first response, one or more predicted responses of the user and/or other users to other prompts or micro-surveys, a probability of the one or more predicted responses, or the like. In some examples, the data acquisition system may use integrated predictive analytics (e.g., based on the one or more predicted responses) to help identify trends or potential issues, which may enable survey administrators to monitor emerging patterns.

As shown by reference number 155, the data acquisition system may transmit, responsive to receiving the indication of the first response, administrator display information that indicates the first response. The administrator display information may indicate how the administrator device is to display an indication of the first response. The indication of the first response may be displayed independently of, or in aggregation with, other response indications. In some examples, the data acquisition system may transmit the administrator display information using a dynamic reporting module that generates live reports that adapt in real-time as new response data is received. In some examples, an analytics dashboard displayed at the administrator device may receive the administrator display information and display the indication of the first response accordingly. The analytics dashboard may be a user interface that provides immediate, actionable feedback based on responses to micro-surveys, thereby enabling the survey administrator to dynamically monitor real-time, dynamic, and ongoing insights, trends over time, and the live reports, and to identify issues as the issues arise. In some examples, the analytics dashboard may leverage the ML model to generate personalized trend charts and alerts.

Figure 1E:
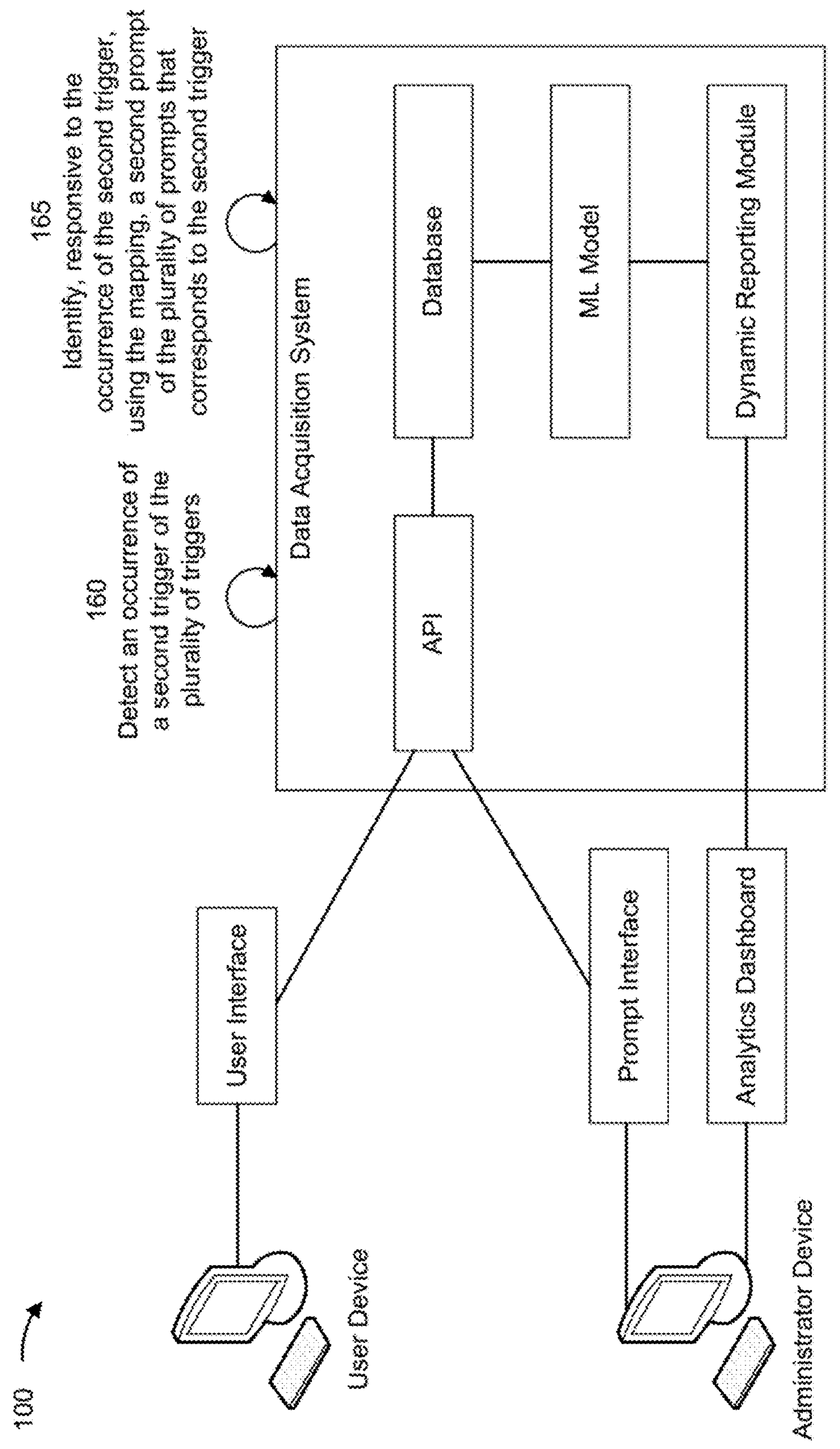

With reference to FIG. 1E, as shown by reference number 160, the data acquisition system may detect an occurrence of a second trigger of the plurality of triggers. The second trigger may be different from the first trigger. For example, the data acquisition system may determine that a second stage of the multi-stage user procedure has ended, a second amount of time has elapsed, the user has performed a second action (e.g., an interaction with software), or the like. In some examples, the data acquisition system may receive information indicating that the second trigger has occurred.

As shown by reference number 165, the data acquisition system may identify, responsive to the occurrence of the second trigger, using the mapping, a second prompt of the plurality of prompts that corresponds to the second trigger. The second prompt may be different from the first prompt. For example, upon detecting the occurrence of the second trigger, the data acquisition system may perform a lookup in the mapping to identify the second prompt that corresponds to the second trigger. The second prompt may belong to a micro-survey that includes one or more second prompts mapped to the second trigger.

In some aspects, the prediction obtained from the ML model may be a modification associated with the second prompt. The modification may be associated with the second prompt in that the modification may introduce a change that impacts the second prompt, such as by generating, updating, or removing the second prompt. For example, the ML model may analyze one or more previous responses (e.g., including the first response), such as by self-categorizing the one or more previous responses, and use artificial intelligence to refactor (e.g., change the content of) prompts, which may improve the quantity and/or quality of future responses.

Figure 1F:
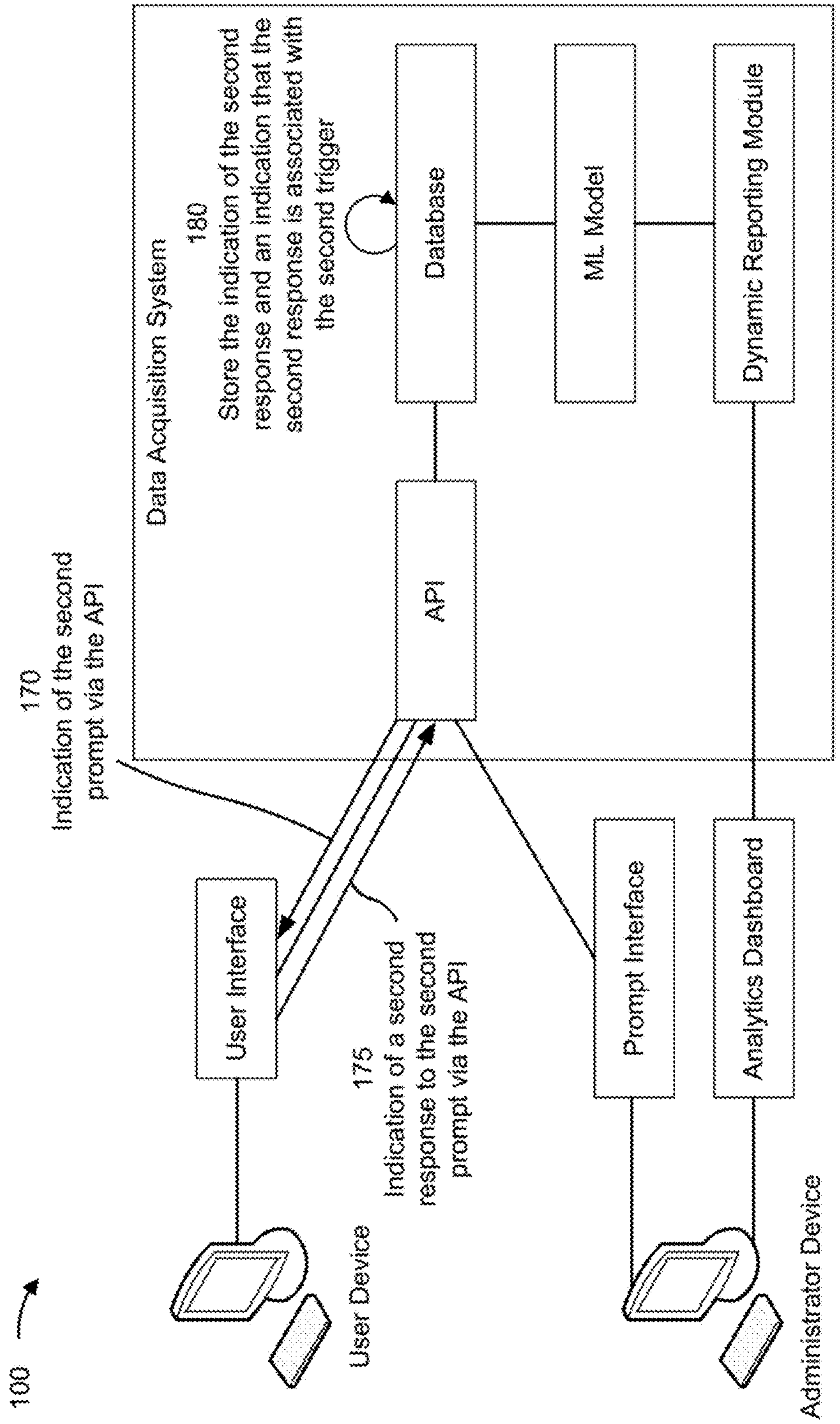

With reference to FIG. 1F, as shown by reference number 170, the data acquisition system may transmit an indication of the second prompt via the API. In some examples, the user interface may display (or cause to be displayed) the second prompt at the user device. In some examples, the data acquisition system may transmit the indication of the second prompt over a second digital channel. For example, the second digital channel may be social media, email, a mobile application, a website, a landing page, or the like. For example, the second prompt may be conveyed to a social media account of the user, an email address of the user, a mobile application stored on a mobile device of the user, a website or landing page visited by the user, or the like.

In some aspects, the data acquisition system may transmit the indication of the second prompt over a second digital channel that is different from the first digital channel. For example, the data acquisition system may integrate micro-surveys that are associated with a single multi-stage user procedure into various digital channels. As a result, the data acquisition system may collect real-time data from a given user across multiple digital channels. In some examples, the data acquisition system may determine which responses transmitted across multiple digital channels are associated with a given user based on private tokenized user interaction tracking, which may involve associating one or more tokens with a user and using the tokens to track the user across multiple digital channels (e.g., tokens may be included with prompts and/or responses). For example, the prompt interface may seamlessly embed micro-surveys across multiple channels using the private tokenized user interaction tracking.

In some aspects, the data acquisition system may transmit the indication of the second prompt and the indication of the first response via the API. For example, the data acquisition system may transmit the indication of the first response concurrently with (or within a short time of) the transmission of the indication of the second prompt. The first response may be, or be part of, a response history of the user (e.g., historical data, historical answers, or the like). In some examples, the data acquisition system may fetch the first response from the database before transmitting the indication of the first response. In some examples, the API may efficiently manage real-time data collection and retrieval by processing responses and accessing historical data. For example, the API may provide answer trends with a current iteration of a survey (e.g., with the second prompt). In some examples, the user interface may display (or cause to be displayed) the first response at the user device. For example, the user interface may allow the user to view historical data (e.g., historical answers, response trends, responses previously submitted by the user, or the like) and/or to perform a personal trend analysis before responding to the second prompt. For example, the user interface may, during a live survey, pre-populate with historical answers, display a chart of user responses over time, provide historical trend views, or the like. For example, the user interface may display a collapsible history that the user can expand to view long-form qualitative data entries (e.g., previous qualitative responses of the user). In some examples, the user interface may adjust survey flow (e.g., when prompts are displayed) based on user input and/or the historical data. Thus, the data acquisition system may use micro-surveys to provide historical data analysis.

As shown by reference number 175, the data acquisition system may receive an indication of a second response to the second prompt via the API. For example, the user may view the second prompt displayed via the user interface and input the second response via the user interface. The second response may have any suitable format, such as quantitative (e.g., a number), qualitative (e.g., a written response containing one or more words), a selection from among multiple choices, a free response (e.g., where the user may provide any suitable input into a response field), or the like. In some examples, the data acquisition system may receive the second response from the user device (e.g., via the user interface).

As shown by reference number 180, the data acquisition system may store, in a database, the indication of the second response and an indication that the second response is associated with the second trigger. For example, the indication that the second response is associated with the second trigger may indicate that the second response is a response to a prompt (e.g., the first prompt) that was transmitted based on an occurrence of the second trigger.

As indicated above, FIGS. 1A-1F are provided as examples. Other examples may differ from what is described with regard to FIGS. 1A-1F.

Figure 2:
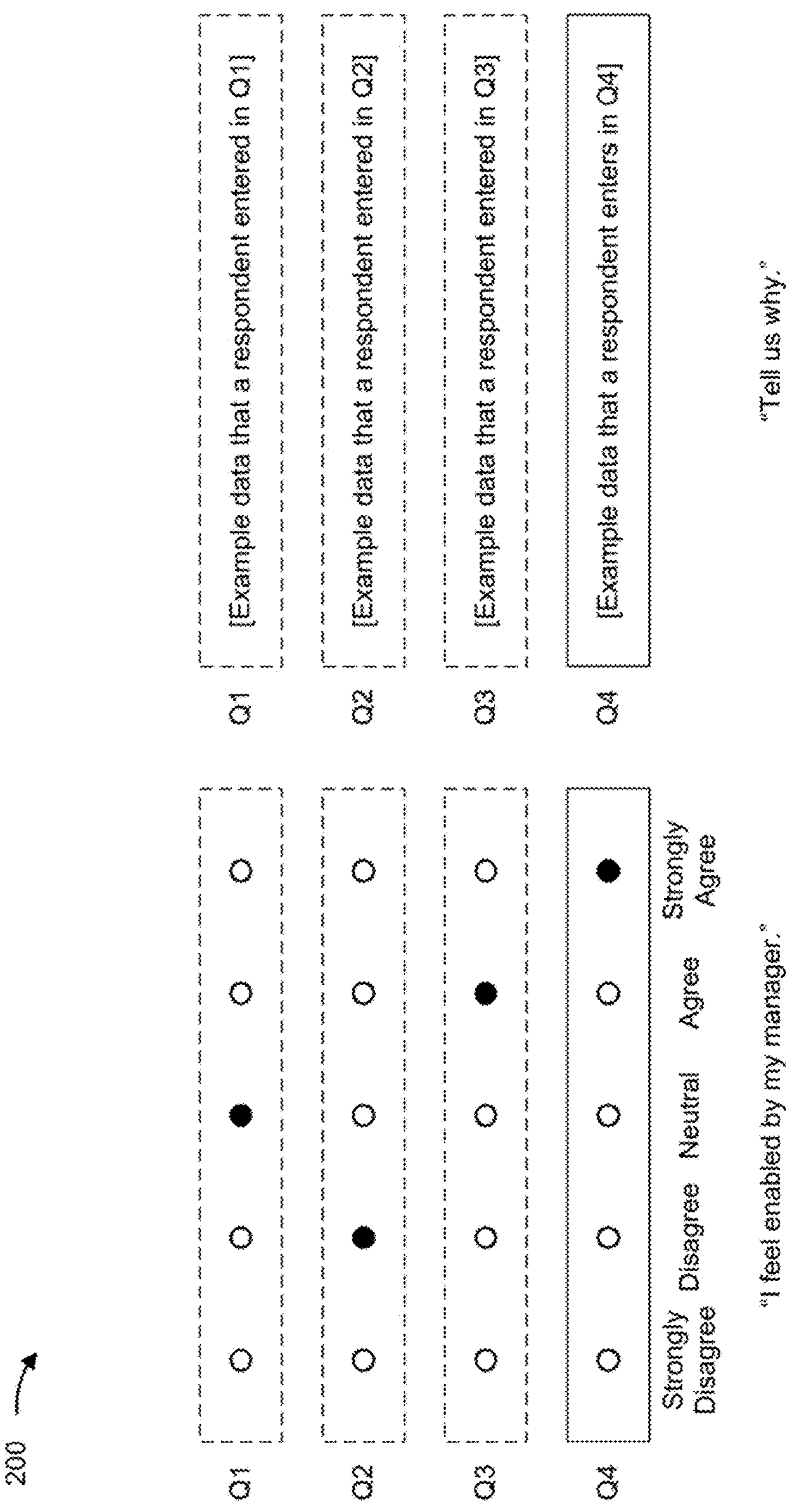
FIG. 2 is a diagram of an example associated with a response history display at a user interface, in accordance with some embodiments of the present disclosure.

FIG. 2 is a diagram of an example 200 associated with a response history display at a user interface.

As discussed above in connection with FIG. 1F, the data acquisition system may transmit the indication of the first response via the API. Upon receiving the indication of the first response via the API, the user interface may display the indication of the first response at the user device. In example 200, the data acquisition system may transmit, and the user interface may display, a plurality of indications of previous responses relating to employee feedback requested periodically. For example, the data acquisition system may provide a micro-survey once every quarter that includes two prompts ("I feel enabled by my manager" and "Tell us why"). The user interface displays the previous responses from the first quarter (Q1), the second quarter (Q2), and the third quarter (Q3). The previous responses may be reproduced verbatim, captured as qualitative feedback, or the like. The current prompts may request employee feedback for the fourth quarter (Q4).

As indicated above, FIG. 2 is provided as an example. Other examples may differ from what is described with regard to FIG. 2.

Identifying the first prompt responsive to the occurrence of the first trigger and identifying the second prompt responsive to the occurrence of the second trigger may help to reduce consumption of memory, processing, and/or bandwidth resources. For example, distributing the first and second prompts in a staged manner may help to improve user engagement (e.g., response rates) and response accuracy by reducing user fatigue and alleviating the burden of long-form surveys for the user. As a result, a lower overall quantity of surveys and/or survey questions can be distributed, which can conserve processing, memory, and/or bandwidth resources that would otherwise be allocated for distribution of many long-form surveys.

Identifying and providing user access to the one or more user resources may help to resolve a user issue quickly, thereby conserving processing and/or memory resources that would otherwise be used by the user attempting to self-diagnose and resolve the user issue. In some examples, the user resource(s) may enable targeted resource delivery for additional levels of support, which can help the conservation of the processing and/or memory resources to begin quickly.

Transmitting the indication of the first prompt over the first digital channel and the indication of the second prompt over the second digital channel that is different from the first digital channel may enable integration of micro-surveys into various digital channels, thereby helping to further improve user engagement (e.g., response rates) and response accuracy by reducing user fatigue and alleviating the burden of long-form surveys for the user, and, thus, further reducing a quantity of processing, memory, and/or bandwidth resources that would otherwise be allocated for distribution of many long-form surveys.

Transmitting the administrator display information may provide insights and trends to the survey administrator quickly via real-time data collection. In some examples, the distributed storage setup of the database may enable quick access to data, which may help to ensure reliability and speed in real-time analysis. As a result, the survey administrator may dynamically adjust survey parameters (e.g., prompts, triggers, mappings, or the like) to improve user engagement (e.g., response rates) and response accuracy, thereby reducing an overall quantity of distributed surveys and/or survey questions, which may conserve processing, memory, and/or bandwidth resources that would otherwise be allocated for distribution of many long-form surveys.

Transmitting the indication of the second prompt and the indication of the first response may enable the user to view historical responses, which may provide a baseline or reminder to the user. For example, the indication of the first response may help to increase user engagement (e.g., response rates) and/or reorient the user in view of a personal trend analysis, which may improve response accuracy. As a result, an overall quantity of distributed surveys and/or survey questions may be further reduced, which can conserve processing, memory, and/or bandwidth resources that would otherwise be allocated for distribution of many long-form surveys.

Obtaining the prediction from the ML model may help to reduce consumption of memory, processing, and/or bandwidth resources that would otherwise be allocated to extensive, time-consuming, and inefficient manual analysis of responses (e.g., qualitative responses). For example, the ML model may perform quick, localized processing of the responses (e.g., qualitative responses), thereby delivering real-time predictions and recommendations based on the latest data with reduced memory, processing, and/or bandwidth resources.

The prediction being the modification associated with the second prompt may help to reduce consumption of memory, processing, and/or bandwidth resources that would otherwise be occupied due to generating, processing, and/or transmitting prompts and responses that are irrelevant. For example, the second prompt may be part of a modified micro-survey that is targeted for the user, which may help to ensure that the second prompt is not irrelevant and, thus, that the memory, processing, and/or bandwidth resources are not consumed by irrelevant prompts.

Figure 3:
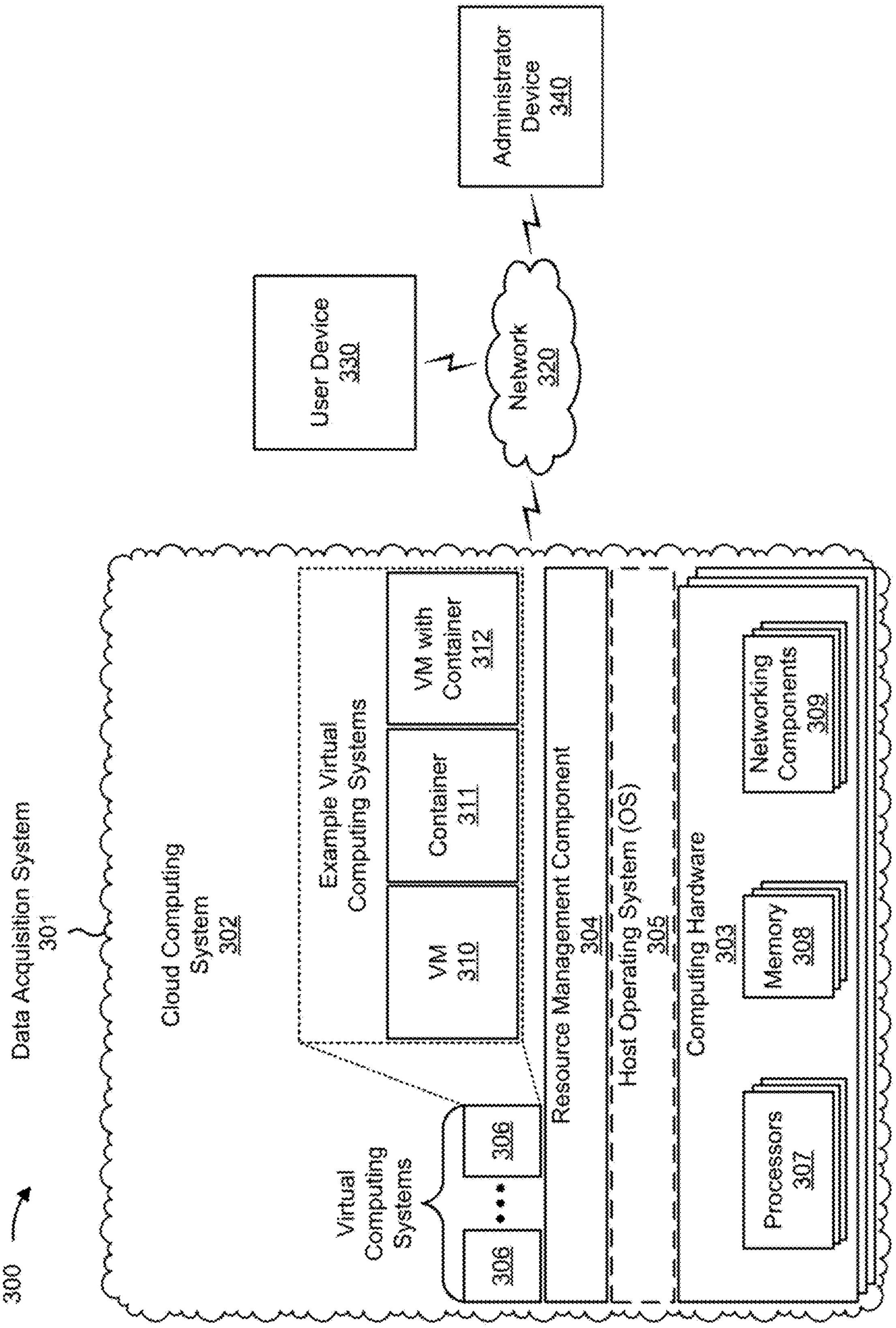
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a data acquisition system 301, which may include one or more elements of and/or may execute within a cloud computing system 302. The cloud computing system 302 may include one or more elements 303-312, as described in more detail below. As further shown in FIG. 3, environment 300 may include a network 320, a user device 330, and/or an administrator device 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309.

Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the data acquisition system 301 may include one or more elements 303-312 of the cloud computing system 302, may execute within the cloud computing system 302, and/or may be hosted within the cloud computing system 302, in some implementations, the data acquisition system 301 may not be cloud-based (e.g., may be implemented outside of a cloud computing system) or may be partially cloud-based. For example, the data acquisition system 301 may include one or more devices that are not part of the cloud computing system 302, such as device 400 of FIG. 4, which may include a standalone server or another type of computing device. The data acquisition system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with staged data acquisition, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The administrator device 340 may include one or more devices capable of receiving, generating, storing, processing, and/or providing information associated with staged data acquisition, as described elsewhere herein. The administrator device 340 may include a communication device and/or a computing device. For example, the administrator device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
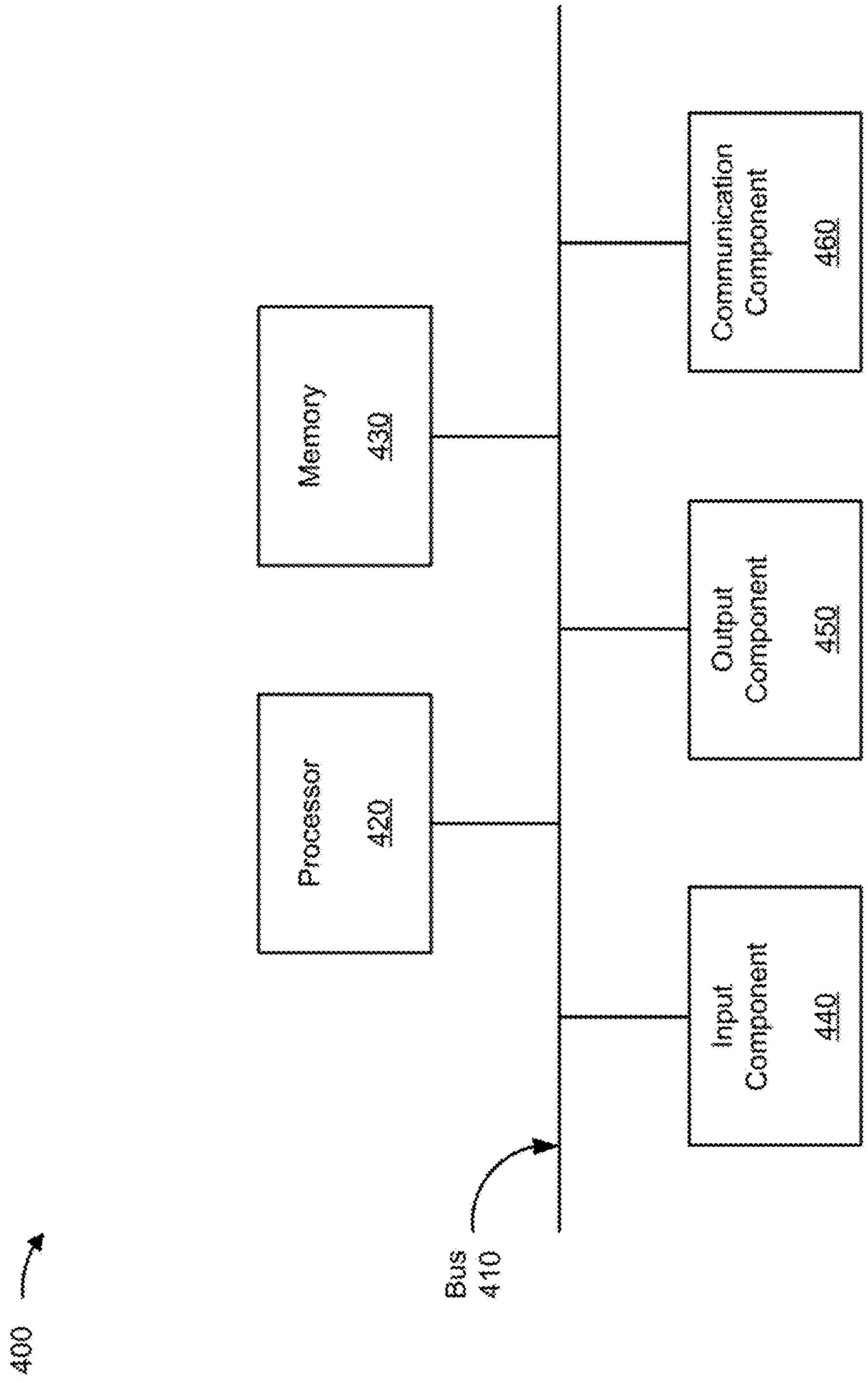
FIG. 4 is a diagram of example components of a device associated with staged data acquisition, in accordance with some embodiments of the present disclosure.

FIG. 4 is a diagram of example components of a device 400 associated with staged data acquisition. The device 400 may correspond to the data acquisition system 301, the user device 330, and/or the administrator device 340. In some implementations, data acquisition system 301, the user device 330, and/or the administrator device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
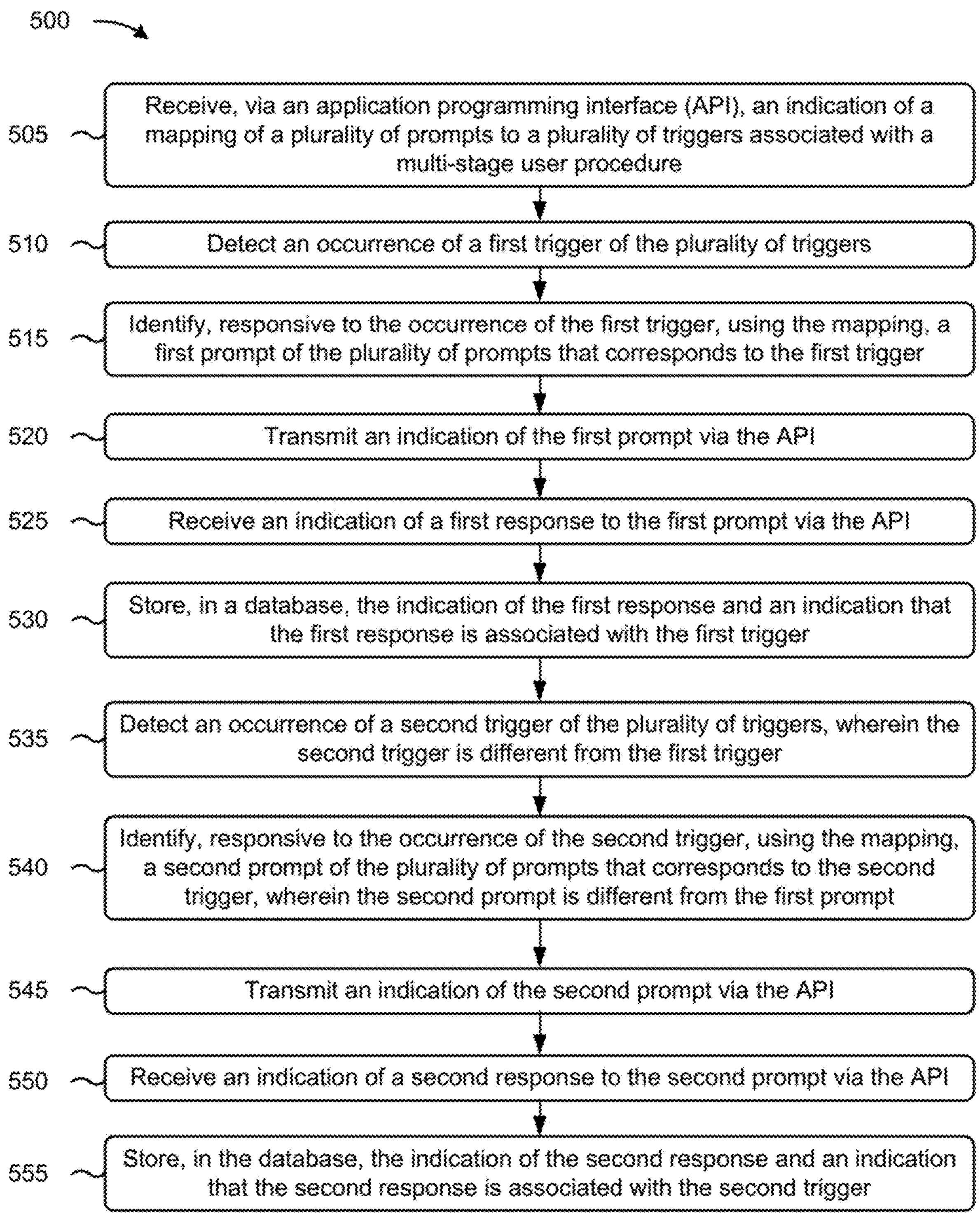
FIG. 5 is a flowchart of an example process associated with staged data acquisition, in accordance with some embodiments of the present disclosure.

FIG. 5 is a flowchart of an example process 500 associated with staged data acquisition. In some implementations, one or more process blocks of FIG. 5 may be performed by the data acquisition system 301. In some implementations, one or more process blocks of FIG. 5 may be performed by another device or a group of devices separate from or including the data acquisition system 301, such as the user device 330 and/or the administrator device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, via an API, an indication of a mapping of a plurality of prompts to a plurality of triggers associated with a multi-stage user procedure (block 505). For example, the data acquisition system 301 (e.g., using processor 420, memory 430, input component 440, and/or communication component 460) may receive, via an API, an indication of a mapping of a plurality of prompts to a plurality of triggers associated with a multi-stage user procedure, as described above in connection with reference number 105 of FIG. 1A. As an example, a first trigger may be an end of a first stage of the multi-stage user procedure, a second trigger may be an end of a second stage of the multi-stage user procedure, and so forth.

As further shown in FIG. 5, process 500 may include detecting an occurrence of a first trigger of the plurality of triggers (block 510). For example, the data acquisition system 301 (e.g., using processor 420 and/or memory 430) may detect an occurrence of a first trigger of the plurality of triggers, as described above in connection with reference number 110 of FIG. 1A. As an example, the data acquisition system 301 may determine that a first stage of the multi-stage user procedure has ended, a first amount of time has elapsed, the user has performed a first action (e.g., an interaction with software), or the like.

As further shown in FIG. 5, process 500 may include identifying, responsive to the occurrence of the first trigger, using the mapping, a first prompt of the plurality of prompts that corresponds to the first trigger (block 515). For example, the data acquisition system 301 (e.g., using processor 420 and/or memory 430) may identify, responsive to the occurrence of the first trigger, using the mapping, a first prompt of the plurality of prompts that corresponds to the first trigger, as described above in connection with reference number 115 of FIG. 1A. As an example, upon detecting the occurrence of the first trigger, the data acquisition system 301 may perform a lookup in the mapping to identify the first prompt that corresponds to the first trigger.

As further shown in FIG. 5, process 500 may include transmitting an indication of the first prompt via the API (block 520). For example, the data acquisition system 301 (e.g., using processor 420, memory 430, and/or communication component 460) may transmit an indication of the first prompt via the API, as described above in connection with reference number 120 of FIG. 1B. As an example, the data acquisition system 301 may transmit the indication of the first prompt over a first digital channel, such as social media, email, a mobile application, a website, a landing page, or the like.

As further shown in FIG. 5, process 500 may include receiving an indication of a first response to the first prompt via the API (block 525). For example, the data acquisition system 301 (e.g., using processor 420, memory 430, input component 440, and/or communication component 460) may receive an indication of a first response to the first prompt via the API, as described above in connection with reference number 125 of FIG. 1B. As an example, first response may have any suitable format, such as quantitative, qualitative, a selection from among multiple choices, a free response, or the like.

As further shown in FIG. 5, process 500 may include storing, in a database, the indication of the first response and an indication that the first response is associated with the first trigger (block 530). For example, the data acquisition system 301 (e.g., using processor 420 and/or memory 430) may store, in a database, the indication of the first response and an indication that the first response is associated with the first trigger, as described above in connection with reference number 130 of FIG. 1B. As an example, the indication that the first response is associated with the first trigger may indicate that the first response is a response to a prompt (e.g., the first prompt) that was transmitted based on an occurrence of the first trigger.

As further shown in FIG. 5, process 500 may include detecting an occurrence of a second trigger of the plurality of triggers, wherein the second trigger is different from the first trigger (block 535). For example, the data acquisition system 301 (e.g., using processor 420 and/or memory 430) may detect an occurrence of a second trigger of the plurality of triggers, wherein the second trigger is different from the first trigger, as described above in connection with reference number 160 of FIG. 1E. As an example, the data acquisition system 301 may determine that a second stage of the multi-stage user procedure has ended, a second amount of time has elapsed, the user has performed a second action (e.g., an interaction with software), or the like.

As further shown in FIG. 5, process 500 may include identifying, responsive to the occurrence of the second trigger, using the mapping, a second prompt of the plurality of prompts that corresponds to the second trigger, wherein the second prompt is different from the first prompt (block 540). For example, the data acquisition system 301 (e.g., using processor 420 and/or memory 430) may identify, responsive to the occurrence of the second trigger, using the mapping, a second prompt of the plurality of prompts that corresponds to the second trigger, wherein the second prompt is different from the first prompt, as described above in connection with reference number 165 of FIG. 1E. As an example, upon detecting the occurrence of the second trigger, the data acquisition system 301 may perform a lookup in the mapping to identify the second prompt that corresponds to the second trigger.

As further shown in FIG. 5, process 500 may include transmitting an indication of the second prompt via the API (block 545). For example, the data acquisition system 301 (e.g., using processor 420, memory 430, and/or communication component 460) may transmit an indication of the second prompt via the API, as described above in connection with reference number 170 of FIG. 1F. As an example, the data acquisition system 301 may transmit the indication of the second prompt over a second digital channel, such as social media, email, a mobile application, a website, a landing page, or the like.

As further shown in FIG. 5, process 500 may include receiving an indication of a second response to the second prompt via the API (block 550). For example, the data acquisition system 301 (e.g., using processor 420, memory 430, input component 440, and/or communication component 460) may receive an indication of a second response to the second prompt via the API, as described above in connection with reference number 165 of FIG. 1F. As an example, the second response may have any suitable format, such as quantitative, qualitative, a selection from among multiple choices, a free response, or the like.

As further shown in FIG. 5, process 500 may include storing, in the database, the indication of the second response and an indication that the second response is associated with the second trigger (block 555). For example, the data acquisition system 301 (e.g., using processor 420 and/or memory 430) may store, in the database, the indication of the second response and an indication that the second response is associated with the second trigger, as described above in connection with reference number 170 of FIG. 1F. As an example, the indication that the second response is associated with the second trigger may indicate that the second response is a response to a prompt (e.g., the second prompt) that was transmitted based on an occurrence of the second trigger.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for staged data acquisition, the system comprising:
- one or more memories; and
- one or more processors, communicatively coupled to the one or more memories, configured to:
  - receive, via an application programming interface (API), an indication of a mapping of a plurality of prompts to a plurality of triggers associated with a multi-stage user procedure associated with a user;
  - detect an occurrence of a first trigger of the plurality of triggers;
  - identify, responsive to the occurrence of the first trigger, using the mapping, a first prompt of the plurality of prompts that corresponds to the first trigger;
  - generate, for the user, a private token uniquely associated with the multi-stage user procedure;
  - transmit an indication of the first prompt via the API, wherein the private token is included with the indication of the first prompt;
  - receive an indication of a first response to the first prompt via the API, wherein the private token is included with the indication of the first response;
  - store, in a database, the indication of the first response and an indication that the first response is associated with the first trigger and the private token;
  - identify one or more user resources indicating content that is relevant to the first response;
  - provide user access to the one or more user resources;
  - detect an occurrence of a second trigger of the plurality of triggers, wherein the second trigger is different from the first trigger;
  - identify, responsive to the occurrence of the second trigger, using the mapping, a second prompt of the plurality of prompts that corresponds to the second trigger, wherein the second prompt is different from the first prompt;
  - transmit an indication of the second prompt via the API, wherein the private token is included with the indication of the second prompt;
  - receive an indication of a second response to the second prompt via the API, wherein the private token is included with the indication of the second response;
  - store, in the database, the indication of the second response and an indication that the second response is associated with the second trigger and the private token;
  - track, in real time, user interactions and responses across the plurality of triggers and digital channels throughout the multi-stage user procedure using the private token to determine which responses transmitted across the plurality of triggers and digital channels are associated with the user, and
  - adjust prompt selection or content for subsequent triggers based on tracked user activity across the plurality of triggers and digital channels determined using the private token.

2. The system of claim 1, wherein the one or more processors, to transmit the indication of the first prompt, are configured to transmit the indication of the first prompt over a first digital channel, and wherein the one or more processors, to transmit the indication of the second prompt, are configured to transmit the indication of the second prompt over a second digital channel that is different from the first digital channel.

3. The system of claim 1, wherein the one or more processors are further configured to:
- transmit, responsive to receiving the indication of the first response, administrator display information that indicates the first response.

4. The system of claim 1, wherein the one or more processors, to transmit the indication of the second prompt, are configured to transmit the indication of the second prompt and the indication of the first response via the API.

5. The system of claim 1, wherein the one or more processors are further configured to:
- input, to a machine learning (ML) model, the indication of the first response; and
- obtain, from the ML model, a prediction that is based on the first response.

6. The system of claim 5, wherein the prediction is a modification associated with the second prompt.

7. The system of claim 5, wherein the prediction is associated with one or more predicted responses.

8. A method of staged data acquisition, comprising:
- receiving, via an application programming interface (API), an indication of a mapping of a plurality of prompts to a plurality of triggers associated with a multi-stage user procedure associated with a user,
- detecting an occurrence of a first trigger of the plurality of triggers;
- identifying, responsive to the occurrence of the first trigger, using the mapping, a first prompt of the plurality of prompts that corresponds to the first trigger;
- generating, for the user, a private token uniquely associated with the multi-stage user procedure;
- transmitting an indication of the first prompt via the API, wherein the private token is included with the indication of the first prompt;
- receiving an indication of a first response to the first prompt via the API, wherein the private token is included with the indication of the first response;

storing, in a database, the indication of the first response and an indication that the first response is associated with the first trigger and the private token;

detecting an occurrence of a second trigger of the plurality of triggers, wherein the second trigger is different from the first trigger;

identifying, responsive to the occurrence of the second trigger, using the mapping, a second prompt of the plurality of prompts that corresponds to the second trigger, wherein the second prompt is different from the first prompt;

transmitting an indication of the second prompt and the first response via the API, wherein the private token is included with the indication of the second prompt;

receiving an indication of a second response to the second prompt via the API, wherein the private token is included with the indication of the second response;

storing, in the database, the indication of the second response and an indication that the second response is associated with the second trigger and the private token;

tracking, in real time, user interactions and responses across the plurality of triggers and digital channels throughout the multi-stage user procedure using the private token to determine which responses transmitted across the plurality of triggers and digital channels are associated with the user, and adjusting prompt selection or content for subsequent triggers based on tracked user activity across the plurality of triggers and digital channels determined using the private token.

9. The method of claim 8, wherein transmitting the indication of the first prompt includes transmitting the indication of the first prompt over a first digital channel, and wherein transmitting the indication of the second prompt includes transmitting the indication of the second prompt over a second digital channel that is different from the first digital channel.

10. The method of claim 8, further comprising:

transmitting, responsive to receiving the indication of the first response, administrator display information that indicates the first response.

11. The method of claim 8, further comprising:

identifying one or more user resources indicating content that is relevant to the first response; and providing user access to the one or more user resources.

12. The method of claim 8, further comprising:

inputting, to a machine learning (ML) model, the indication of the first response; and obtaining, from the ML model, a prediction that is based on the first response.

13. The method of claim 12, wherein the prediction is a modification associated with the second prompt.

14. The method of claim 12, wherein the prediction is associated with one or more predicted responses.

15. A non-transitory computer-readable medium storing a set of instructions, the set of instructions comprising:

one or more instructions that, when executed by one or more processors of a device, cause the device to:

receive, via an application programming interface (API), an indication of a mapping of a plurality of prompts to a plurality of triggers associated with a multi-stage user procedure associated with a user;

detect an occurrence of a first trigger of the plurality of triggers;

identify, responsive to the occurrence of the first trigger, using the mapping, a first prompt of the plurality of prompts that corresponds to the first trigger;

generate, for the user, a private token uniquely associated with the multi-stage user procedure;

transmit an indication of the first prompt via the API, wherein the private token is included with the indication of the first prompt;

receive an indication of a first response to the first prompt via the API, wherein the private token is included with the indication of the first response;

store, in a database, the indication of the first response and an indication that the first response is associated with the first trigger and the private token;

transmit, responsive to receiving the indication of the first response, administrator display information that indicates the first response;

detect an occurrence of a second trigger of the plurality of triggers, wherein the second trigger is different from the first trigger;

identify, responsive to the occurrence of the second trigger, using the mapping, a second prompt of the plurality of prompts that corresponds to the second trigger, wherein the second prompt is different from the first prompt;

transmit an indication of the second prompt via the API, wherein the private token is included with the indication of the second prompt;

receive an indication of a second response to the second prompt via the API, wherein the private token is included with the indication of the second response;

store, in the database, the indication of the second response and an indication that the second response is associated with the second trigger and the private token;

track, in real time, user interactions and responses across the plurality of triggers and digital channels throughout the multi-stage user procedure using the private token to determine which responses transmitted across the plurality of triggers and digital channels are associated with the user, and adjust prompt selection or content for subsequent triggers based on tracked user activity across the plurality of triggers and digital channels determined using the private token.

16. The non-transitory computer-readable medium of claim 15, wherein the one or more instructions, when executed by the one or more processors, further cause the device to:

identify one or more user resources indicating content that is relevant to the first response; and provide user access to the one or more user resources.

17. The non-transitory computer-readable medium of claim 15, wherein the one or more instructions, that cause the device to transmit the indication of the first prompt, cause the device to transmit the indication of the first prompt over a first digital channel, and wherein the one or more instructions, that cause the device to transmit the indication of the second prompt, cause the device to transmit the indication of the second prompt over a second digital channel that is different from the first digital channel.

18. The non-transitory computer-readable medium of claim 15, wherein the one or more instructions, when executed by the one or more processors, further cause the device to:

input, to a machine learning (ML) model, the indication of the first response; and obtain, from the ML model, a prediction that is based on the first response.

19. The non-transitory computer-readable medium of claim 18, wherein the prediction is a modification associated with the second prompt.

20. The non-transitory computer-readable medium of claim 18, wherein the prediction is associated with one or more predicted responses.

* * * * *